United States Patent
Akama et al.

(10) Patent No.: US 9,648,155 B2
(45) Date of Patent: May 9, 2017

(54) MOBILE TERMINAL, ONBOARD DEVICE, CONTROL METHOD, AND CONTROL PROGRAM

(71) Applicants: HONDA MOTOR CO., LTD., Minato-ku, Tokyo (JP); PIONEER CORPORATION, Kawasaki-shi, Kanagawa (JP)

(72) Inventors: Shinichi Akama, Cupertino, CA (US); Naoto Furuyama, Utsunomiya (JP); Yoshihiro Mishio, Shioya-Gun (JP); Yuji Yokota, Utsunomiya (JP); Motohiro Kubo, Osaka (JP); Takuya Katoh, Kawagoe (JP)

(73) Assignees: Honda Motor Co., Ltd., Tokyo (JP); Pioneer Corporation, Kanagawa (JP)

( * ) Notice: Subject to any disclaimer, the term of this patent is extended or adjusted under 35 U.S.C. 154(b) by 0 days.

(21) Appl. No.: 14/913,585

(22) PCT Filed: Sep. 3, 2014

(86) PCT No.: PCT/JP2014/073131
§ 371 (c)(1),
(2) Date: Feb. 22, 2016

(87) PCT Pub. No.: WO2015/033947
PCT Pub. Date: Mar. 12, 2015

(65) Prior Publication Data
US 2016/0212254 A1    Jul. 21, 2016

(30) Foreign Application Priority Data
Sep. 4, 2013 (JP) ................. 2013-183416

(51) Int. Cl.
*H04M 3/00* (2006.01)
*H04M 1/725* (2006.01)
(Continued)

(52) U.S. Cl.
CPC ...... *H04M 1/7253* (2013.01); *G01C 21/3688* (2013.01); *H04M 1/6083* (2013.01); *H04M 1/6091* (2013.01)

(58) Field of Classification Search
CPC .................. H04M 1/6091; H04M 1/7253
(Continued)

(56) References Cited

U.S. PATENT DOCUMENTS 8,036,715 B2 * 10/2011 Buck .................. H04M 1/6083
381/302
8,725,217 B2 * 5/2014 Kitahara ............. H04M 1/6091
455/41.1
(Continued)

FOREIGN PATENT DOCUMENTS

JP  2008236687 A  10/2008
JP  2010258956 A  11/2010
(Continued)

OTHER PUBLICATIONS

International Search Report for PCT/JP2014/073131.
Office Action mailed Jan. 17, 2017 corresponding to Japanese Patent Application No. 2015-535487.

*Primary Examiner* — Babar Sarwar
(74) *Attorney, Agent, or Firm* — Carrier Blackman & Associates, P.C.; Joseph P. Carrier; Jingli Wang

(57) ABSTRACT

A mobile terminal that performs communication with an onboard device includes: a communication control unit configured to control reception of information instructing to switch a sound source which is transmitted from the onboard device, the information including information indicating an application program which is executed in the terminal serving as the sound source, and transmission of a sound, played by an application program operating in a foreground of the terminal, to the onboard device; a switching unit configured to switch an application program having been in
(Continued)

operation in a foreground until immediately before, to a background, on the basis of the received information instructing to switch a sound source, and to switch an application program having been in operation in a background until immediately before, to a foreground; and a sound control unit configured to stop playing a sound of the application program having been in operation in a foreground until immediately before, and to start playing a sound of the application program having been in operation in a background until immediately before, subsequently to the stop.

15 Claims, 10 Drawing Sheets

(51) Int. Cl.
*H04M 1/60* (2006.01)
*G01C 21/36* (2006.01)

(58) Field of Classification Search
USPC ... 455/418–422.1, 569.1, 569.2, 575.9, 41.1, 455/41.2
See application file for complete search history.

(56) References Cited

U.S. PATENT DOCUMENTS

| | | | | |
|---|---|---|---|---|
| 8,855,557 | B2* | 10/2014 | Moosavi | H04B 5/00 455/41.1 |
| 2003/0032460 | A1* | 2/2003 | Cannon | H04M 1/6091 455/569.2 |
| 2003/0063756 | A1* | 4/2003 | Geerlings | H04R 5/02 381/86 |
| 2005/0064835 | A1* | 3/2005 | Gusler | H04M 1/6083 455/245.1 |
| 2006/0240778 | A1* | 10/2006 | Yuki | H04M 1/6066 455/41.2 |
| 2006/0258406 | A1* | 11/2006 | Igarashi | H04M 1/6066 455/567 |
| 2008/0032663 | A1* | 2/2008 | Doyle | H04H 20/106 455/345 |
| 2010/0120366 | A1* | 5/2010 | DeBiasio | H04M 1/6091 455/41.3 |
| 2012/0220283 | A1* | 8/2012 | Tadayon | H04W 4/025 455/418 |
| 2013/0093958 | A1* | 4/2013 | Yoshikawa | G01C 21/3661 348/705 |
| 2013/0190978 | A1* | 7/2013 | Kato | G01C 21/3664 701/36 |
| 2015/0105020 | A1* | 4/2015 | Aida | H04M 1/72519 455/41.2 |

FOREIGN PATENT DOCUMENTS

| | | |
|---|---|---|
| JP | 2012010287 A | 1/2012 |
| JP | 2013083607 A | 5/2013 |
| JP | 2013114383 A | 6/2013 |
| JP | 2013171514 A | 9/2013 |

* cited by examiner

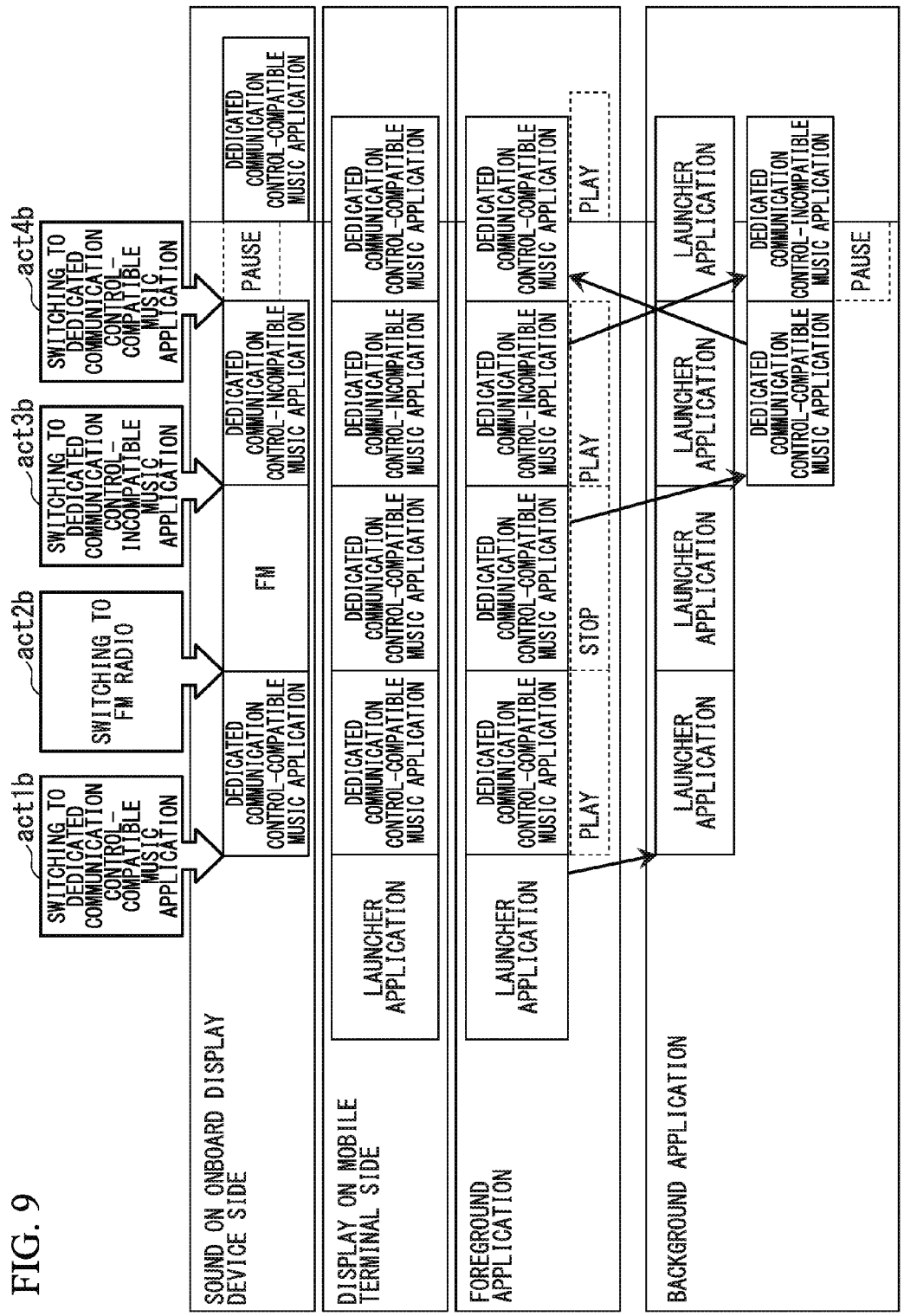

FIG. 10

TRANSITION TABLE OF SOUND PLAYED IN ONBOARD DISPLAY DEVICE BY SWITCHING OF ONBOARD SWITCH — rw1

| STATE BEFORE SWITCHING OF SOUND | | | SWITCHING OF ONBOARD SWITCH | STATE AFTER SWITCHING OF SOUND | | REMARKS |
|---|---|---|---|---|---|---|
| SCREEN | SOUND | FRONT APPLICATION OF MOBILE TERMINAL | | SCREEN | SOUND | |
| ONBOARD NAVIGATION | FM | MUSIC APPLICATION | MUSIC APPLICATION OF MOBILE TERMINAL | NAVIGATION APPLICATION | MUSIC APPLICATION | |
| ONBOARD NAVIGATION | FM | NAVIGATION APPLICATION | IT IS NOT POSSIBLE TO SELECT MUSIC APPLICATION OF MOBILE TERMINAL | ONBOARD NAVIGATION | FM | |
| ONBOARD NAVIGATION | MUSIC APPLICATION | MUSIC APPLICATION | FM | NAVIGATION APPLICATION | FM | SINCE FOREGROUND APPLICATION IS NOT MUSIC APPLICATION, SWITCHING OF SOUND SOURCE BY ONBOARD SWITCH IS NOT ABLE TO BE PERFORMED |
| ONBOARD NAVIGATION | MUSIC APPLICATION | NAVIGATION APPLICATION | FM | NAVIGATION APPLICATION | FM | |
| FM SOURCE | FM | MUSIC APPLICATION | MUSIC APPLICATION OF MOBILE TERMINAL | MUSIC APPLICATION | MUSIC APPLICATION | |
| FM SOURCE | FM | NAVIGATION APPLICATION | IT IS NOT POSSIBLE TO SELECT MUSIC APPLICATION OF MOBILE TERMINAL | FM SOURCE | FM | |
| MUSIC APPLICATION | MUSIC APPLICATION | MUSIC APPLICATION | FM | FM | FM | SINCE FOREGROUND APPLICATION IS NOT MUSIC APPLICATION, SWITCHING OF SOUND SOURCE BY ONBOARD SWITCH IS NOT ABLE TO BE PERFORMED |
| MUSIC APPLICATION | FM | NAVIGATION APPLICATION | IT IS NOT POSSIBLE TO SELECT MUSIC APPLICATION OF MOBILE TERMINAL | MUSIC APPLICATION | FM | SINCE FOREGROUND APPLICATION IS NOT MUSIC APPLICATION, SWITCHING OF SOUND SOURCE BY ONBOARD SWITCH IS NOT ABLE TO BE PERFORMED |
| MUSIC APPLICATION | MUSIC APPLICATION | NAVIGATION APPLICATION | FM | NAVIGATION APPLICATION | FM | | rw2

MOBILE TERMINAL, ONBOARD DEVICE, CONTROL METHOD, AND CONTROL PROGRAM

TECHNICAL FIELD

The present invention relates to a mobile terminal, an onboard device, a control method, and a control program.

Priority is claimed on Japanese Patent Application No. 2013-183416, filed Sep. 4, 2013, the content of which is incorporated herein by reference.

BACKGROUND ART

In recent years, multifunctional cellular phones as represented by a multifunctional cellular phone terminal (smartphone) have been in widespread use. A multifunctional cellular phone terminal realizes various functions by various types of applications being installed. In many cases, such applications may have a function, such as the playback of radio or music data, these applications being incorporated into audio in the related art. In association therewith, a desire to use functions of such audio and the like, mounted on a multifunctional cellular phone terminal, in an onboard device has recently increased.

In this connection, a system has been known where a desired application is started up in a shorter period of time with less operation man-hours when portable appliances and onboard appliances are used in conjunction with each other (see, for example, Patent Document 1). In addition, a sound output control device has been known where a cellular phone connected to the sound output control device transmits audio data to the sound output control device in a streaming manner and the sound output control device automatically processes the transmitted audio data using an optimum application without manually selecting the audio data (see, for example, Patent Document 2).

CITATION LISTS

Patent Literatures

[Patent Document 1] Japanese Unexamined Patent Application, First Publication No. 2012-10287

[Patent Document 2] Japanese Unexamined Patent Application, First Publication No. 2010-258956

SUMMARY OF INVENTION

Technical Problem

However, systems, sound output control devices, and the like of the related art have limited processes which are capable of being realized by various application programs during operation in an onboard device, on the basis of information transmitted from the onboard device side to the mobile terminal side. For example, when an application program that performs communication specified by a certain protocol performs communication with the onboard device, control of an operation for an application program that performs communication specified by another protocol may not be able to be performed from the onboard device side. In addition, there may be a case where one application program is given an exclusive right, and operations of other application programs can only be controlled restrictively during the operation of the one application program.

An aspect according to the present invention is contrived in view of such problems of the related art, and an object thereof is to provide a mobile terminal, an onboard device, a control method, and a control program which are capable of smoothly switching an application program on a mobile terminal side, on the basis of information which is acquired from an onboard device side.

Solution to Problem

Aspects according to the present invention adopt the following configurations in order to solve the above problems.

(1) According to an aspect of the present invention, there is provided a mobile terminal that performs communication with an onboard device, including: a communication control unit configured to control reception of information instructing to switch a sound source which is transmitted from the onboard device, the information including information indicating an application program which is executed in the terminal serving as the sound source, and transmission of a sound, played by an application program operating in a foreground of the terminal, to the onboard device; a switching unit configured to switch an application program having been in operation in a foreground until immediately before, to a background, on the basis of the received information instructing to switch a sound source, and to switch an application program having been in operation in a background until immediately before, to a foreground; and a sound control unit configured to stop playing a sound of the application program having been in operation in a foreground until immediately before, and to start playing a sound of the application program having been in operation in a background until immediately before, subsequently to the stop.

(2) In the aspect of the above (1), after switching is performed by the switching unit, the sound control unit may stop playing the sound of the application program having been in operation in a foreground until immediately before, and start playing the sound of the application program having been in operation in a background until immediately before, subsequently to the stop.

(3) In the aspect of the above (1) or (2), the sound control unit may start playing the sound through a dedicated application programming interface (API).

(4) According to an aspect of the present invention, there is provided a control method of a mobile terminal that performs communication with an onboard device, including: receiving information instructing to switch a sound source which is transmitted from the onboard device, the information including information indicating an application program which is executed in the terminal serving as the sound source; transmitting a sound, played by an application program operating in a foreground of the terminal, to the onboard device; switching an application program having been in operation in a foreground until immediately before, to a background, on the basis of the received information instructing to switch a sound source, and switching an application program having been in operation in a background until immediately before, to a foreground; and stopping playing a sound of the application program having been in operation in a foreground until immediately before, and starting playing a sound of the application program having been in operation in a background until immediately before, subsequently to the stop.

(5) According to an aspect of the present invention, there is provided a control program causing a computer of a mobile terminal that performs communication with an onboard device to execute: a procedure of receiving information instructing to switch a sound source which is transmitted from the onboard device, the information including information indicating an application program which is executed in the terminal serving as the sound source; a procedure of transmitting a sound, played by an application program operating in a foreground of the terminal, to the onboard device; a procedure of switching an application program having been in operation in a foreground until immediately before, to a background, on the basis of the received information instructing to switch a sound source, and switching an application program having been in operation in a background until immediately before, to a foreground; and a procedure of stopping playing a sound of the application program having been in operation in a foreground until immediately before, and starting playing a sound of the application program having been in operation in a background until immediately before, subsequently to the stop.

(6) According to an aspect of the present invention, there is provided an onboard device that performs communication with a mobile terminal, including: a reception unit configured to receive a sound played by an application program operating in a foreground of the mobile terminal; an output unit configured to output the sound received by the reception unit; an acquisition unit configured to acquire information instructing to switch a sound source; a transmission unit configured to transmit, to the mobile terminal, information including information indicating an application program which is executed in the mobile terminal, the information being for switching an application program having been in operation in a foreground until immediately before in the mobile terminal, to a background, and switching an application program having been in operation in a background until immediately before, to a foreground, on the basis of the information instructing to switch a sound source acquired by the acquisition unit.

(7) In the aspect of any one of the above (1) to (3), the mobile terminal may further include a communication unit configured to transmit information, indicating at least one or more application programs which are executed in the terminal, to the onboard device.

(8) In the aspect of the above (6), the reception unit may receive information, indicating at least one or more application programs which are executed in the mobile terminal, from the mobile terminal.

Advantageous Effects of Invention

According to the aspects of the above (1), (4), and (5), the mobile terminal receives the information instructing to switch a sound source which is transmitted from the onboard device, switches an application program having been in operation in the foreground until immediately before, to the background, on the basis of the received information instructing to switch a sound source, switches an application program having been in operation in the background until immediately before, to the foreground, stops playing a sound of the application program having been in operation in the foreground until immediately before, and starts playing a sound of the application program having been in operation in the background until immediately before. Therefore, the application program on the mobile terminal side can be smoothly switched on the basis of the information acquired from the onboard device side, without depending on the standard of the music application which is installed on the mobile terminal.

In the case of the above (2), the mobile terminal switches the application program having been in operation in the foreground until immediately before, to the background, switches the application program having been in operation in the background until immediately before, to the foreground, then stops playing the sound of the application program having been in operation in the foreground until immediately before, and starts playing the sound of the application program having been in operation in the background until immediately before, subsequently to the stop. Therefore, it is possible to smoothly switch the application program on the mobile terminal side, and to smoothly switch an application program which plays a sound on the mobile terminal side.

In the case of the above (3), the mobile terminal starts playing the sound of the application program having been in operation in the background until immediately before, through the dedicated application programming interface (API). Therefore, even in the case of a situation where the playback of the sound of an application program is not able to be started in control based on the API specified for each mobile terminal, it is possible to play the sound of the application program.

In the case of the above (6), the onboard device acquires information instructing to switch a sound source acquired within a vehicle, transmits, to the mobile terminal, information for switching an application program having been in operation in a foreground until immediately before, to a background, and switching an application program having been in operation in a background until immediately before, to a foreground, on the basis of the acquired information instructing to switch a sound source, to thereby stop playing the sound of the application program having been in operation in a foreground until immediately before, in the mobile terminal, and starts playing the sound of the application program having been in operation in a background until immediately before. Thereby, the application program on the mobile terminal side can be smoothly switched on the basis of the information acquired from the onboard device side, without depending on the standard of the music application which is installed on the mobile terminal.

BRIEF DESCRIPTION OF DRAWINGS

FIG. 9 is a diagram illustrating an example of operations which are performed between the mobile terminal 300 which is an aspect of the present invention and the onboard display device 200.

FIG. 10 is a conceptual diagram illustrating switching operations of sound sources by an onboard switch 100, images which are displayed on the onboard display device 200 and sounds which are played before and after switching of sound sources.

DESCRIPTION OF EMBODIMENTS

Figure 1:
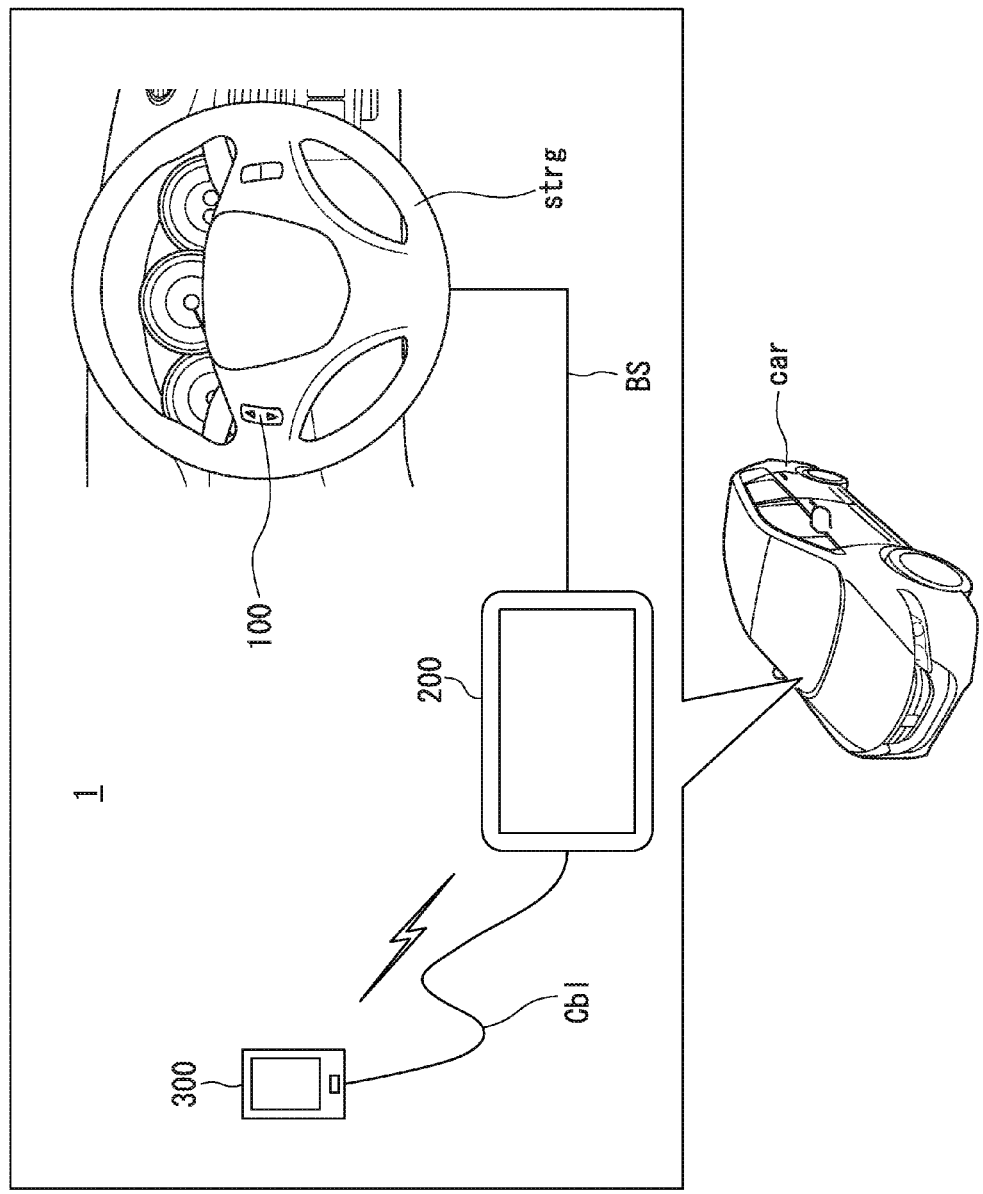
FIG. 1 is a diagram illustrating an example of a use situation of an electronic communication system 1 in a first embodiment.

Hereinafter, an embodiment of the present invention will be described in detail with reference to the accompanying drawings. FIG. 1 is a diagram illustrating an example of a use situation of an electronic communication system 1 in a first embodiment. The electronic communication system 1 in the first embodiment includes, for example, an onboard switch 100, an onboard display device 200 (onboard device), and a mobile terminal 300. The onboard switch 100 is, for example, a steering switch or the like which is mounted on an automobile Car. The steering switch refers to a switch included in a steering strg of the automobile shown in FIG. 1. The onboard switch 100 is communicably connected to the onboard display device 200 through a steering electronic control unit (ECU), a bus BS within a vehicle, or the like. Cable communication through the bus BS within a vehicle is performed by, for example, a controller area network (CAN) standard.

The onboard switch 100 functions as a switch for switching a sound source of a sound which is played through the onboard display device 200 when the onboard switch is connected to the onboard display device 200, and functions as, for example, a switch or the like of an air conditioner when the onboard switch is not connected thereto. The sound source of a sound which is played through the onboard display device 200 is, for example, a frequency modulation (FM) radio, an amplitude modulation (AM) radio, a compact disc (CD; Registered Trademark), a Mini-Disc (MD; Registered Trademark), a digital versatile disc (DVD; Registered Trademark), a Blu-ray disc (BD; Registered Trademark), a car navigation, an application program for playing a sound which is installed on a multifunctional cellular phone terminal described later, or the like.

The onboard display device 200 is, for example, an onboard device which is mounted on the automobile Car, and includes a display unit or a speaker. Specifically, the onboard display device 200 is an audio device with a display, a car navigation device, or the like, but may also be used as an onboard television receiver or the like. The onboard display device 200 is communicably connected to the mobile terminal 300 by a plurality of communication specifications (for example, wireless communication or cable communication through a cable Cb1). The wireless communication is performed by, for example, the standard of Bluetooth (Registered Trademark). In addition, the wireless communication may be performed by a wireless local area network (LAN), Wi-Fi Direct (Registered Trademark), or the like. On the other hand, the cable communication through the cable Cb1 is performed by, for example, the standard of a high-definition multimedia interface (HDMI; Registered Trademark), a universal serial bus (USB), or the like.

When the onboard display device 200 acquires information instructing to switch a sound source from the onboard switch 100 using the CAN communication from the automobile Car, the device transmits the acquired information to the mobile terminal 300 using the aforementioned wireless communication. In addition, the onboard display device 200 receives an input from a user in an input reception unit described later, and outputs information indicating the received input from a user to the mobile terminal 300 through the cable Cb1. The information indicating the input from a user is, for example, information relating to coordinates in which a touch operation has been performed on a touch panel, but may be information obtained by pressing down various types of buttons, information obtained by turning on/off various types of switches separate from the onboard switch 100, or the like. In addition, the onboard display device 200 acquires various types of images or sounds from the mobile terminal 300, and outputs the acquired images or sounds to a display unit or a speaker of the device which is described later.

The mobile terminal 300 is, for example, a multifunctional cellular phone terminal (smartphone), but may be other types of portable information terminals such as a cellular phone terminal, a tablet personal computer (PC), a notebook PC, an electronic book reader, or a personal digital assistant (PDA). The mobile terminal 300 has various types of application programs installed thereon, and has various functions performed by various types of application programs starting up. An example of such functions includes an application program having an audio function of performing radio or music playback, or an application program having a function of car navigation.

The mobile terminal 300 acquires information instructing to switch a sound source from the onboard display device 200, for example, using the wireless communication, switches an application program during startup in a foreground on the basis of the acquired information, and plays a sound of the application program switched during startup in the foreground. In addition, when the application program during startup in the foreground is switched, the mobile terminal 300 stops the sound which is played by the application program having started up in the foreground until immediately before. The mobile terminal 300 transmits the sound which is played by the application program during startup in the foreground, to the onboard display device 200, for example, using the cable communication performed through the cable Cb1. In this manner, the mobile terminal 300 can acquire the information instructing to switch a sound source by the onboard switch 100 from the onboard display device 200, and switch the sound source for playing a sound on the basis of the acquired information. Meanwhile, the information which is transmitted and received using the wireless communication and the cable communication may have a reverse relation (for example, a sound may be transmitted and received in a wireless manner, and the information instructing to switch a sound source may be transmitted and received in a wired manner).

Figure 2:
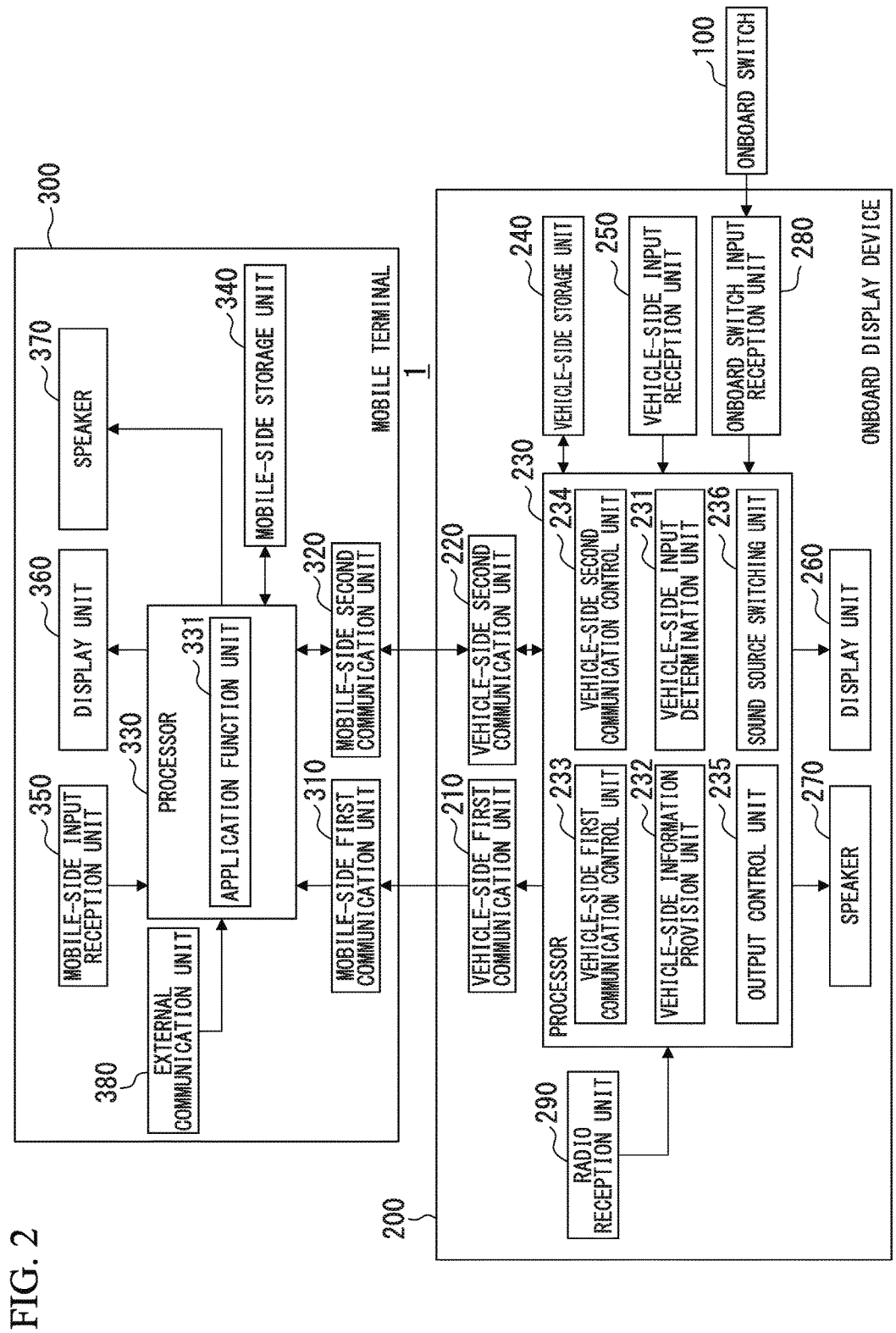
FIG. 2 is a diagram illustrating an example of a functional configuration of the electronic communication system 1.

FIG. 2 is a diagram illustrating an example of a functional configuration of the electronic communication system 1. The onboard display device 200 includes, for example, a vehicle-side first communication unit 210 (transmission unit), a vehicle-side second communication unit 220 (reception unit), a processor 230, a vehicle-side storage unit 240, a vehicle-side input reception unit 250, a display unit 260, a speaker 270 (output unit), and an onboard switch input reception unit 280. The vehicle-side first communication unit 210 includes, for example, a Bluetooth antenna, is a wireless communication module that performs wireless communication based on a Bluetooth standard, and performs communication using the industry science medical (ISM) band of a 2.4 GHz band. In the wireless communication system of a Bluetooth standard, frequency hopping (FH)-type spectrum spread communication is used. The frequency band of a 2.4 GHz band is divided into 79 frequency channels (hereinafter, called communication channels) at 1 MHz intervals, and switching of a frequency channel to be used is performed in a time-division manner for each time slot on the basis of a hopping pattern (frequency hopping). The wireless communication system of a Bluetooth standard is performed by a master-slave system, and the management of a hopping pattern is performed by a master. It is possible to perform communication by forming a wireless network referred to as Piconet between one master and up to seven slaves, using the same hopping pattern. The vehicle-side first communication unit 210 performs wireless communication with the mobile-side first communication unit 310 of the mobile terminal 300 on the basis of the Bluetooth standard.

The vehicle-side second communication unit 220 includes, for example, hardware for performing communication based on the HDMI (Registered Trademark) standard. The vehicle-side second communication unit 220 includes, for example, an HDMI (Registered Trademark) terminal to which an HDMI (Registered Trademark) cable is connected, and an interface unit which is capable of transmitting and receiving various types of information relating to an image signal, a sound signal, and an image format to and from a device that outputs an image or a sound. This interface unit has a plurality of channels, and various types of images or sounds are transmitted and received using a transition minimized differential signaling (TMDS) channel.

In addition, the vehicle-side second communication unit 220 further includes hardware for performing communication based on the USB standard. The vehicle-side second communication unit 220 includes a USB connector and an interface unit which is capable of transmitting and receiving various types of information relating to an image signal, a sound signal, and an image format to and from a device that outputs an image or a sound.

The processor 230 is, for example, a central processing unit (CPU) of the onboard display device 200. The processor 230 executes various types of programs which are stored in the vehicle-side storage unit 240 described later, and thus realizes each of the following software function units. The processor 230 includes a vehicle-side input determination unit 231, a vehicle-side information provision unit 232, a vehicle-side first communication control unit 233, a vehicle-side second communication control unit 234, and an output control unit 235, for example, as the software function units.

The vehicle-side input determination unit 231 determines that information indicating an input from a user acquired by the processor 230 from the vehicle-side input reception unit 250 or the onboard switch input reception unit 280 described later is information indicating an input from a user acquired from the vehicle-side input reception unit 250 the information indicating an input from a user acquired from the onboard switch input reception unit 280. When the information indicating an input from a user acquired by the processor 230 is the information acquired from the onboard switch input reception unit 280, the vehicle-side input determination unit 231 outputs the information, as information instructing to switch a sound source, to a sound source switching unit 236 described later. In addition, when the information indicating an input from a user acquired by the processor 230 is the information acquired from the vehicle-side input reception unit 250, the vehicle-side input determination unit 231 outputs the information to the vehicle-side second communication control unit 234. The information indicating an input from a user acquired from the vehicle-side input reception unit 250 refers to information (for example, information of coordinates in which a touch operation has been performed) indicating an operation received from a user by the vehicle-side input reception unit 250.

When information indicating various types of application programs which are visualized by a launcher application of the mobile terminal 300 is acquired from the vehicle-side second communication control unit 234, the sound source switching unit 236 stores the acquired information in the vehicle-side storage unit 240. The information indicating various types of application programs refers to, for example, information indicating the capability of communicating with the vehicle-side first communication control unit 233 for each application program, information relating to communication with the vehicle-side first communication control unit 233 for each application program, or the like. The sound source switching unit 236 generates a candidate of a switching destination of a sound source on the basis of this information.

In addition, when the information instructing to switch a sound source is acquired from the vehicle-side input determination unit 231, the sound source switching unit 236 switches a sound source of the onboard display device 200 on the basis of the acquired information and the candidate of the switching destination of a sound source which is generated on the basis of the information indicating various types of application programs stored in the vehicle-side storage unit 240. The sound source switching unit 236 generates the FM radio, the AM radio, and various types of application programs of the mobile terminal 300, for example, as the candidate of the switching destination of a sound source. In addition, when various types of application programs of the mobile terminal 300 are selected during switching of a sound source, the sound source switching unit 236 outputs information instructing to switch a sound source to the selected application program, to the vehicle-side first communication control unit 233. The information instructing to switch a sound source to the selected application program includes, for example, information for identifying the selected application program, and is hereinafter called selected application sound source switching information.

The vehicle-side information provision unit 232 is, for example, a function unit for providing vehicle information to the mobile terminal 300 through the vehicle-side first communication unit 210, and performs an operation based on a dedicated protocol for transmitting and receiving vehicle information, such as the selected application sound source switching information, which is capable of being acquired from a vehicle using wireless communication. When the selected application sound source switching information from the sound source switching unit 236 is acquired, the vehicle-side information provision unit 232 outputs the acquired selected application sound source switching information to the mobile terminal 300. In this case, the vehicle-side information provision unit 232 outputs the acquired selected application sound source switching information to the vehicle-side first communication control unit 233, converts the information into a protocol data unit (PDU) capable of being transmitted by the vehicle-side first communication unit 210, and then transmits the result to the mobile terminal 300. Meanwhile, the vehicle-side information provision unit 232 and the vehicle-side first communication control unit 233 may be an integrated function unit.

The vehicle-side first communication control unit 233 converts the selected application sound source switching information acquired from the vehicle-side information provision unit 232 into a PDU capable of being transmitted by the vehicle-side first communication unit 210. The vehicle-side first communication control unit 233 causes the mobile terminal 300 to transmit the converted PDU to the vehicle-side first communication unit 210.

The vehicle-side second communication control unit 234 converts the information converted into a PDU capable of being received by the vehicle-side second communication unit 220, the information being related to various types of images or sounds which are acquired from the mobile terminal 300, into information of a format capable of being handled by the onboard display device 200. In addition, the vehicle-side second communication control unit 234 converts the information indicating an input from a user which is acquired from the vehicle-side input reception unit 250 described later, into a PDU capable of being received by the vehicle-side second communication unit 220, and causes the vehicle-side second communication unit 220 to transmit the converted PDU to the mobile terminal 300. In addition, the vehicle-side second communication control unit 234 acquires the information indicating various types of application programs which are visualized by the aforementioned launcher application of the mobile terminal 300, from the mobile-side second communication unit 320 (communication unit) of the mobile terminal 300, through the vehicle-side second communication unit 220, and outputs the acquired information to the sound source switching unit 236.

The output control unit 235 outputs an image, converted into a format capable of being handled by the vehicle-side second communication control unit 234, to the display unit 260 to display the output image, and outputs the converted sound to the speaker 270 to output the output sound. In addition, when the sound source switching unit 236 switches a sound source to the AM radio or the FM radio, the output control unit 235 acquires a sound signal of the AM radio or the FM radio from a radio reception unit 290, and plays a sound in the speaker 270 on the basis of the acquired sound signal.

The vehicle-side storage unit 240 includes, for example, a RAM, a register, a hard disk drive (HDD), a solid state drive (SSD), or the like. The vehicle-side storage unit 240 stores various types of programs which are executed by the processor 230.

The vehicle-side input reception unit 250 is, for example, a touch panel, but may include various types of buttons or switches and the like which are mounted on the onboard display device 200. The vehicle-side input reception unit 250 receives an input from a user, and outputs information (for example, information of coordinates in which a touch operation has been performed) indicating the received operation to the processor 230.

The display unit 260 is, for example, a liquid crystal display panel or an organic EL (Electro Luminescence) display panel. The display unit 260 displays an image acquired from the output control unit 235.

The speaker 270 outputs a sound acquired from the output control unit 235.

The onboard switch input reception unit 280 receives an input from a user from the onboard switch 100 using the CAN communication, and outputs information indicating the received input from a user to the processor 230.

The radio reception unit 290 includes an antenna that receives a sound signal of radio broadcasting such as AM radio broadcasting or FM radio broadcasting, an antenna circuit, a tuning circuit, a detector circuit, and an output circuit, and outputs the received sound signal of radio broadcasting to the processor 230.

The mobile terminal 300 includes, for example, a mobile-side first communication unit 310, a mobile-side second communication unit 320, a processor 330, a mobile-side storage unit 340, a mobile-side input reception unit 350, a display unit 360, a speaker 370, and an external communication unit 380. Similarly to the vehicle-side first communication unit 210, the mobile-side first communication unit 310 is a wireless communication module that performs wireless communication based on the Bluetooth standard, and performs communication with the vehicle-side first communication unit 210.

Similarly to the vehicle-side second communication unit 220, the mobile-side second communication unit 320 includes hardware for performing communication based on the HDMI (Registered Trademark) standard, and hardware for performing communication based on the USB standard. That is, the onboard display device 200 and the mobile terminal 300 have the vehicle-side second communication unit 220 and the mobile-side second communication unit 320 physically connected to each other by an HDMI (Registered Trademark) cable or a USB cable, and thus can transmit and receive various types of images or sounds and information indicating an input from a user, using communication based on the HDMI (Registered Trademark) standard or communication based on the USB standard.

The processor 330 is, for example, a CPU. The processor 330 executes various types of programs which are stored in the mobile-side storage unit 340 described later. Programs which are executed by the processor 330 include, for example, various types of application programs which are executed by the processor 330, as an application function unit 331.

The application function unit 331 is various types of application programs which are executed by the processor 330. The application function unit 331 performs the following operations on the basis of various types of information which are acquired from the mobile-side first communication unit 310, the mobile-side second communication unit 320, the mobile-side input reception unit 350, and the like. The application function unit 331 generates an image for display on the display unit 170. In addition, the application function unit 331 generates a sound for emission in the speaker 180. The application function unit 331 plays a sound of music data which is stored in the mobile-side storage unit 340. Further, the application function unit 331 receives data of Internet radio broadcasting from the external communication unit 380, and plays a sound of the received data. The application function unit 331 displays the generated image on the display unit 360, and outputs the played sound to the speaker 180 to output the output sound.

The application function unit 331 can simultaneously operate a plurality of application programs. Here, an application program for generating an image which is displayed on the forefront of the display unit 360 is called a foreground application. In addition, although not displayed on the display unit 360, an application program which is executed and operated in the processor 330 is called a background application. The application function unit 331 transmits an image and a sound of an application program which is in operation as the foreground application, to the vehicle-side second communication unit 220 of the onboard display device 200, through the mobile-side second communication unit 320. In addition, the application function unit 331 transmits information for the processor 330 to identify various types of application programs during execution to the vehicle-side second communication unit 220 through the mobile-side second communication unit 320.

The mobile-side storage unit 340 includes, for example, a flash memory, a random access memory (RAM), a register, and the like. The mobile-side storage unit 340 stores various types of programs which are executed by the processor 330.

The mobile-side input reception unit 350 is, for example, a touch panel, but may include various types of buttons or switches and the like. The mobile-side input reception unit 350 receives an input from a user, and outputs information indicating the received operation to the processor 330.

The display unit 360 is, for example, a liquid crystal display panel or an organic EL display panel. The display unit 360 displays an image generated by the foreground application which is in operation in the application function unit 331. Meanwhile, the mobile-side input reception unit 350 and the display unit 360 may be an integrated display with a touch panel.

The speaker 370 outputs a sound played by the foreground application which is in operation in the application function unit 331.

The external communication unit 380 includes an antenna, a modulation unit, an encoding/demodulation unit, an up/down converter, and the like. The external communication unit 380 performs communication through a moving object communication network or a wireless LAN, and thus transmits and receives information to and from, for example, various types of servers present on the Internet.

Figure 3:
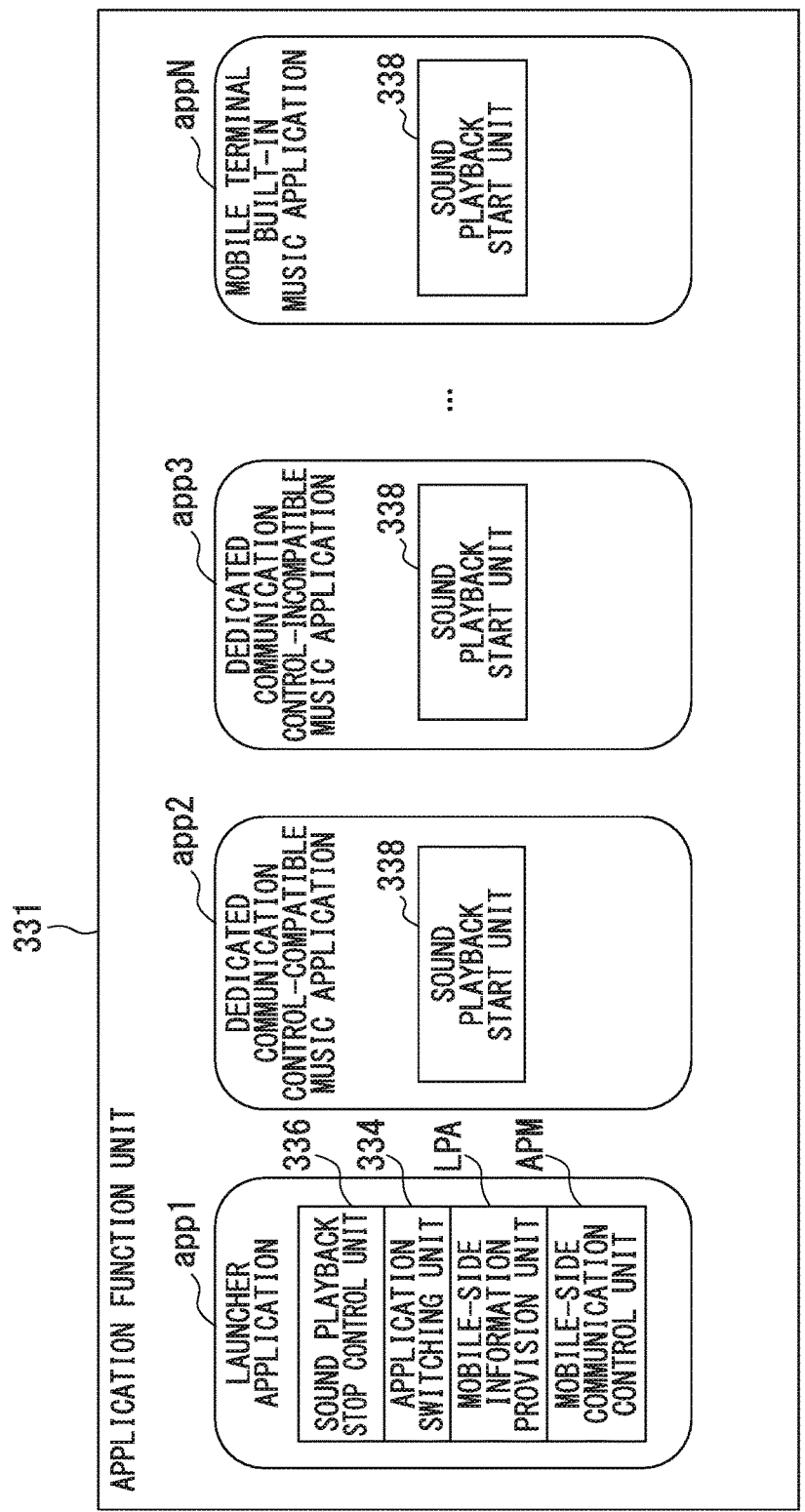
FIG. 3 is a diagram illustrating an example of software structures of various types of application programs which are realized by a processor 330 of a mobile terminal 300 shown in FIG. 2.

Next, reference will be made to FIGS. 3 and 4 to describe software structures of various types of application programs which are in operation in the application function unit 331. FIG. 3 is a diagram illustrating an example of software structures of various types of application programs which are realized by the processor 330 of the mobile terminal 300 shown in FIG. 2. In the mobile terminal 300, the processor 330 executes various types of application programs, and thus applications app1 to appN can operate. The application app1 is a launcher application, and visualizes various types of application programs which are capable of communicating with the onboard display device 200, as a link collection. That is, the application app1 causes the display unit 360 to display an image in which a link destination is represented by an icon or the like.

The application app2 is a music application program for transmitting a sound which is played by the application app2 to the onboard display device 200 through a mobile-side communication control unit APM, described later, included in the application app1, and is hereinafter called a dedicated communication control-compatible music application. The application app3 is a music application program for transmitting a sound which is played by the application app3 to the onboard display device 200 directly through the mobile-side second communication unit 320 without going through the application app1, and is hereinafter called a dedicated communication control-incompatible music application. The application app3 performs communication with the onboard display device 200 through the mobile-side second communication unit 320, using an independent protocol different from a dedicated protocol for specifying communication which is performed by the mobile-side communication control unit APM. For this reason, in an onboard display device of the related art, when the application app3 of the mobile terminal 300 is selected by a switching operation of a sound source by the onboard switch 100, application programs other than an application program in which communication is performed by the aforementioned independent protocol are not able to be recognized in the onboard display device. Thereafter, the dedicated communication control-compatible music application disappears from a selection candidate due to the switching operation of a sound source by the onboard switch 100, and thus is not able to be selected.

The application appN is a music application program which is built into the mobile terminal 300, and transmits a sound which is played by the application appN to the onboard display device 200 through the mobile-side communication control unit APM, similarly to the application app2. In addition, when the application appN is executed even once by the processor 330, unlike applications for playing other sounds, the sound which is played by the application appN may be output to the speaker 370 or the onboard display device 200 preferentially over the sounds which are played by the applications for playing other sounds, regardless of the foreground application or the background application. Hereinafter, this preferential sound output is referred to as the sound output priority of the application appN, and the application appN will be described as having the sound output priority.

Since the application appN has the sound output priority, the mobile terminal 300 is not able to output a sound of a separate application program from the application appN to the speaker 370 or the onboard display device 200, insofar as the mobile terminal 300 having operated the application appN does not terminate the operation of the application appN or stop (including "pause") playing the sound of the application appN.

Meanwhile, in the example shown in FIG. 3, the application function unit 331 is depicted so as to include only the music application program, but may include, for example, a car navigation application, an Internet radio application, or the like without being limited thereto.

In addition, in the example shown in FIG. 3, the application app1 includes a mobile-side information provision unit LPA, a mobile-side communication control unit APM (communication control unit), a mobile-side input determination unit 332, an application switching unit 334 (switching unit), and a sound playback stop control unit 336 (sound control unit). The mobile-side information provision unit LPA is a function unit for receiving the selected application sound source switching information through the mobile-side first communication unit 310, and is constituted by a dedicated protocol for transmitting and receiving vehicle information. The mobile-side information provision unit LPA receives the selected application sound source switching information from the onboard display device 200 through the mobile-side communication control unit APM. Meanwhile, the mobile-side information provision unit LPA may transmit and receive not only the selected application sound source switching information, but also other vehicle information, for example, the velocity, rotational speed of an engine, exhaust sound, and the like of the automobile Car through the mobile-side communication control unit APM.

The mobile-side communication control unit APM receives the selected application sound source switching information converted into a PDU capable of being received by the wireless communication. In addition, the mobile-side communication control unit APM converts information for identifying various types of images or sounds and various types of application programs which are transmitted to the vehicle-side second communication unit 220, into a PDU capable of being received by the mobile-side second communication unit 320 that performs cable communication, and transmits the converted PDU to the vehicle-side second communication unit 220. In addition, the mobile-side communication control unit APM acquires the information indicating an input from a user, the information being converted into a PDU capable of being received by the mobile-side second communication unit 320, from the vehicle-side second communication unit 220, through the mobile-side second communication unit 320.

The application switching unit 334 switches the foreground application on the basis of the selected application sound source switching information acquired by the mobile-side information provision unit LPA. Specifically, the application switching unit 334 performs control for switching the applications app2 to appN which are in operation from the foreground application to the background application, or from the background application to the foreground application, on the basis of information for identifying an application included in the selected application sound source switching information. Meanwhile, the application switching unit 334 holds the foreground application when the information for the application switching unit 334 to identify an application included in the selected application sound source switching information indicates an application program which is presently operating as the foreground application.

The application switching unit 334 switches the foreground application on the basis of the information for identifying an application included in the selected application sound source switching information. Therefore, even when the dedicated communication control-incompatible music application such as the application app3, as the switching destination of a sound source by the onboard switch 100, is once selected as the foreground application, the mobile terminal 300 can switch the foreground application to the dedicated communication control-compatible music application through a switching operation of the next sound source.

The sound playback stop control unit 336 stops playing a sound of the application program switched from the foreground application to the background application through the application switching unit 334, and starts playing a sound of the application program switched from the background application to the foreground application. Here, the sound playback stop control unit 336 starts playing a sound, for example, using a dedicated application programming interface (API) capable of controlling a sound playback start unit 338 (sound control unit) described later.

The applications app2 to appN have a function of the sound playback start unit 338. The sound playback start unit 338 starts playing a sound when a request for sound playback start through the dedicated API used by the sound playback stop control unit 336 is acquired from the sound playback stop control unit 336.

Even when a mobile terminal built-in music application, such as the application appN, having the sound output priority, as the switching destination of a sound source by the onboard switch 100, is once selected as the foreground application, the mobile terminal 300 can stop playing a sound of the mobile terminal built-in music application having the sound output priority through a switching operation of the next sound source, using the functions of the sound playback stop control unit 336 (sound control unit) and the sound playback start unit 338 (sound control unit) which are described above. The mobile terminal 300 can play a sound of the foreground application.

In this manner, in the example shown in FIG. 3, the application switching unit 334 of the application app1 which is a launcher application switches the foreground application on the basis of the selected application sound source switching information acquired from the onboard display device 200. The sound playback stop control unit 336 stops playing a sound of the background application, and starts playing the sound of the foreground application.

Figure 4:
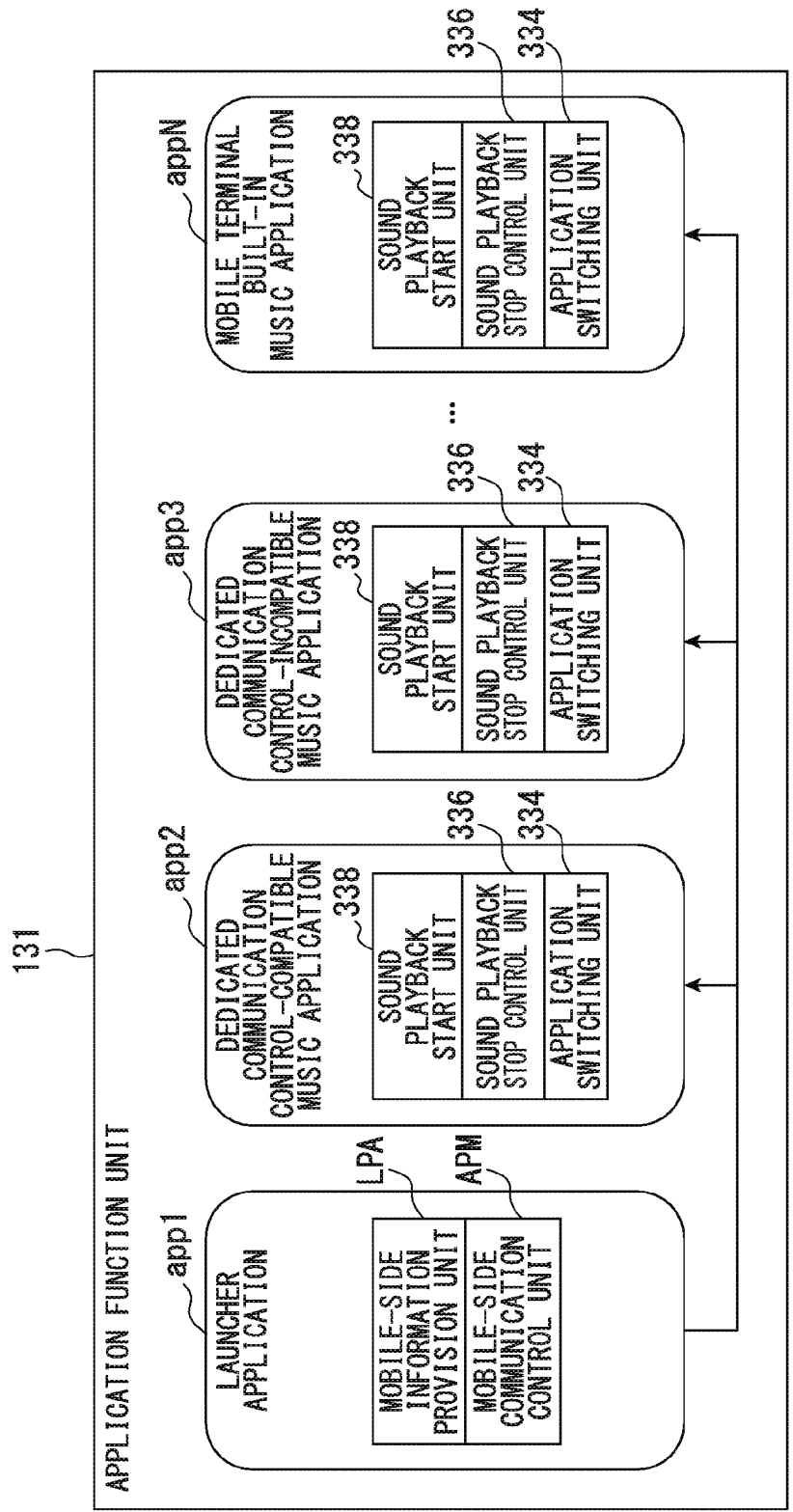
FIG. 4 is a diagram illustrating another example of software structures of various types of application programs which are realized by the processor 330 of the mobile terminal 300 shown in FIG. 2.

FIG. 4 is a diagram illustrating another example of software structures of various types of application programs which are realized by the processor 330 of the mobile terminal 300 shown in FIG. 2. In the example shown in FIG. 4, the application app1 has functions of the mobile-side communication control unit APM and the mobile-side information provision unit LPA, and the applications app2 to appN have functions of the application switching unit 334, the sound playback stop control unit 336, and the sound playback start unit 338. Therefore, the application app1 acquires selected application sound source switching information from the onboard display device 200, and outputs the acquired selected application sound source switching information to the applications app2 to appN.

The applications app2 to appN perform switching from the foreground application to the background application, or from the background application to the foreground application, on the basis of the acquired selected application sound source switching information. The applications app2 to appN stop playing a sound of the application program switched from the foreground application to the background application by the application switching unit 334, the sound playback stop control unit 336, and the sound playback start unit 338, and start playing a sound of the application program switched from the background application to the foreground application.

In this manner, in the example shown in FIG. 4 the application app1 which is a launcher application acquires the selected application sound source switching information from the onboard display device 200, but each of the application programs of the applications app2 to appN perform switching of the foreground application, stopping playing the sound of the background application, and starting playing the sound of the foreground application.

Figure 5:
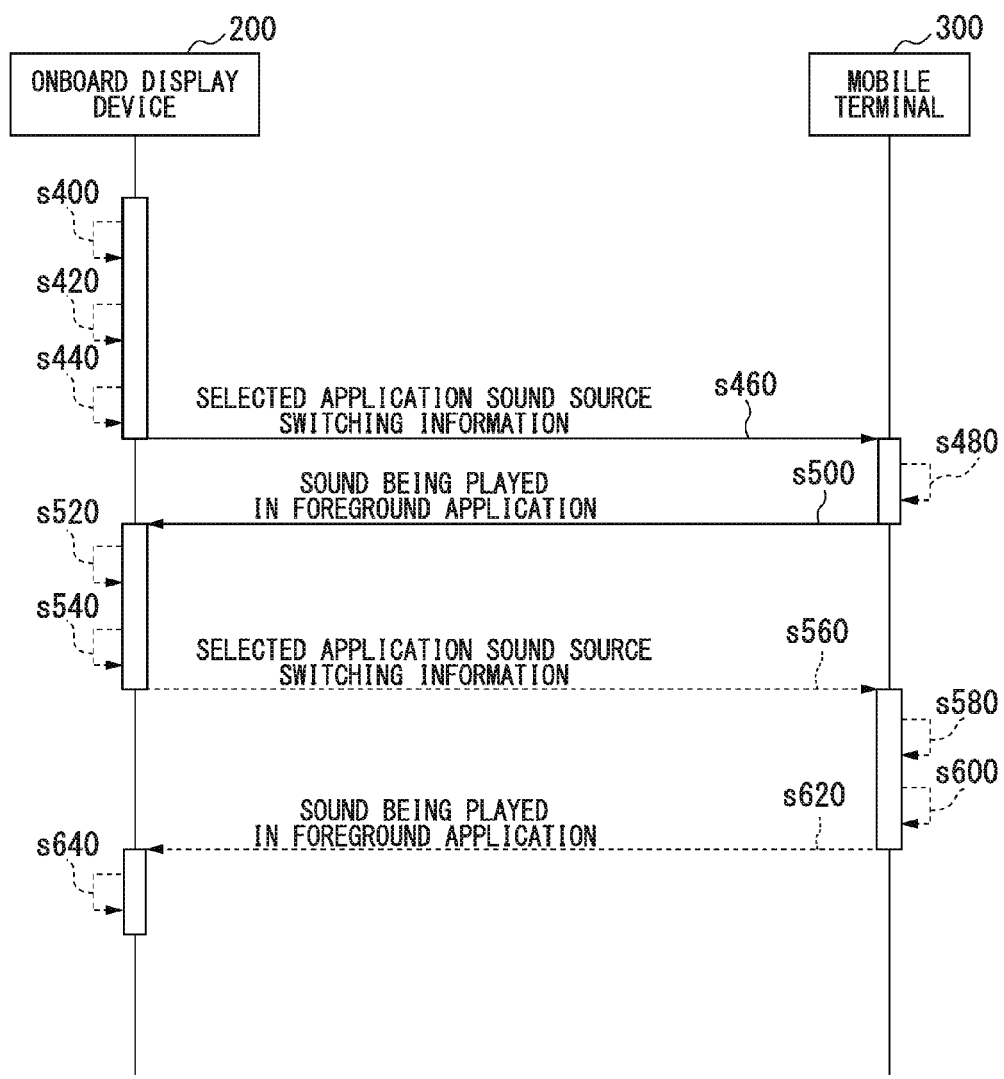
FIG. 5 is a sequence diagram illustrating an example of flows of operations of an onboard display device 200 and the mobile terminal 300 during sound source switching when a foreground application of the mobile terminal 300 is an application app3 which is a dedicated communication control-incompatible music application.

Next, reference will be made to FIGS. 5 and 6 to describe flows of operations during sound source switching between the onboard display device 200 and the mobile terminal 300 in the electronic communication system 1. FIG. 5 is a sequence diagram illustrating an example of flows of operations of the onboard display device 200 and the mobile terminal 300 during sound source switching when the foreground application of the mobile terminal 300 is the application app3 which is the dedicated communication control-incompatible music application.

(Step S400) First, the onboard display device 200 receives information instructing to switch a sound source from a user through the onboard switch input reception unit 280. Hereinafter, the information received in step S400 by the onboard switch input reception unit 280 will be described as indicating switching of a sound source to the FM radio.

(Step S420) Next, the onboard display device 200 starts playing a sound of the FM radio on the basis of the received information instructing to switch a sound source, and outputs the sound of the FM radio from the speaker 270.

(Step S440) Next, the onboard display device 200 receives the information instructing to switch a sound source from a user, again, through the onboard switch input reception unit 280. Hereinafter, the information received in step S440 by the onboard switch input reception unit 280 will be described as indicating switching of a sound source to the application app3 which is the dedicated communication control-incompatible music application.

(Step S460) Next, the sound source switching unit 236 of the onboard display device 200 acquires information instructing to switch a sound source to the application app3 of the mobile terminal 300 as the information instructing to switch a sound source, and thus switches the sound source to a sound which is acquired from the mobile terminal 300.

The sound source switching unit 236 of the onboard display device 200 transmits the selected application sound source switching information including information for identifying the application app3 which has been acquired in step S460, to the mobile terminal 300.

(Step S480) Next, the application switching unit 334 of the mobile terminal 300 acquires the received selected application sound source switching information, but an application program which is presently operating as the foreground application is the application app3, and thus a current state is held.

(Step S500) Next, the mobile terminal 300 plays a sound of the application app3 operating as the foreground application, and transmits the played sound to the onboard display device 200.

(Step S520) Next, the onboard display device 200 outputs a sound played by the application app3 which has been received from the mobile terminal 300, to the speaker 270.

(Step S540) Next, the onboard display device 200 receives the information instructing to switch a sound source from a user, again, through the onboard switch input reception unit 280. Hereinafter, the information received in step S540 by the onboard switch input reception unit 280 will be described as indicating switching of a sound source to the application app2 which is a dedicated communication control-compatible music application.

(Step S560) Next, the sound source switching unit 236 of the onboard display device 200 acquires information instructing to switch a sound source to the application app2 of the mobile terminal 300 as the information instructing to switch a sound source, and thus holds the sound source as a sound which is acquired from the mobile terminal 300. The sound source switching unit 236 of the onboard display device 200 transmits the selected application sound source switching information including information for identifying the application app2 which has been acquired in step S540, to the mobile terminal 300.

(Step S580) Next, the application switching unit 334 of the mobile terminal 300 switches the foreground application from the application app3 to the application app2, on the basis of the information for identifying the application app2 included in the received selected application sound source switching information.

(Step S600) Next, the sound playback stop control unit 336 of the mobile terminal 300 stops playing the sound of the application app3 switched from the foreground application to the background application. The sound playback stop control unit 336 and the sound playback start unit 338 of the mobile terminal 300 start playing the sound of the application app2 switched from the background application to the foreground application.

(Step S620) Next, the mobile terminal 300 operates as the foreground application, and transmits the sound of the application app2 playing a sound to the onboard display device 200.

(Step S640) Next, the onboard display device 200 outputs the sound played by the application app2 which has been received from the mobile terminal 300, to the speaker 270.

In this manner, the mobile terminal 300 can receive the selected application sound source switching information including information for identifying an application program, through the switching operation of a sound source from a user which is received by the onboard display device 200, and switch the foreground application which is executed in the mobile terminal 300 by the application switching unit 334, on the basis of the received selected application sound source switching information. Therefore, even after the dedicated communication control-incompatible music application is selected as a sound source, the mobile terminal 300 can switch the foreground application to the dedicated communication control-compatible music application.

Figure 6:
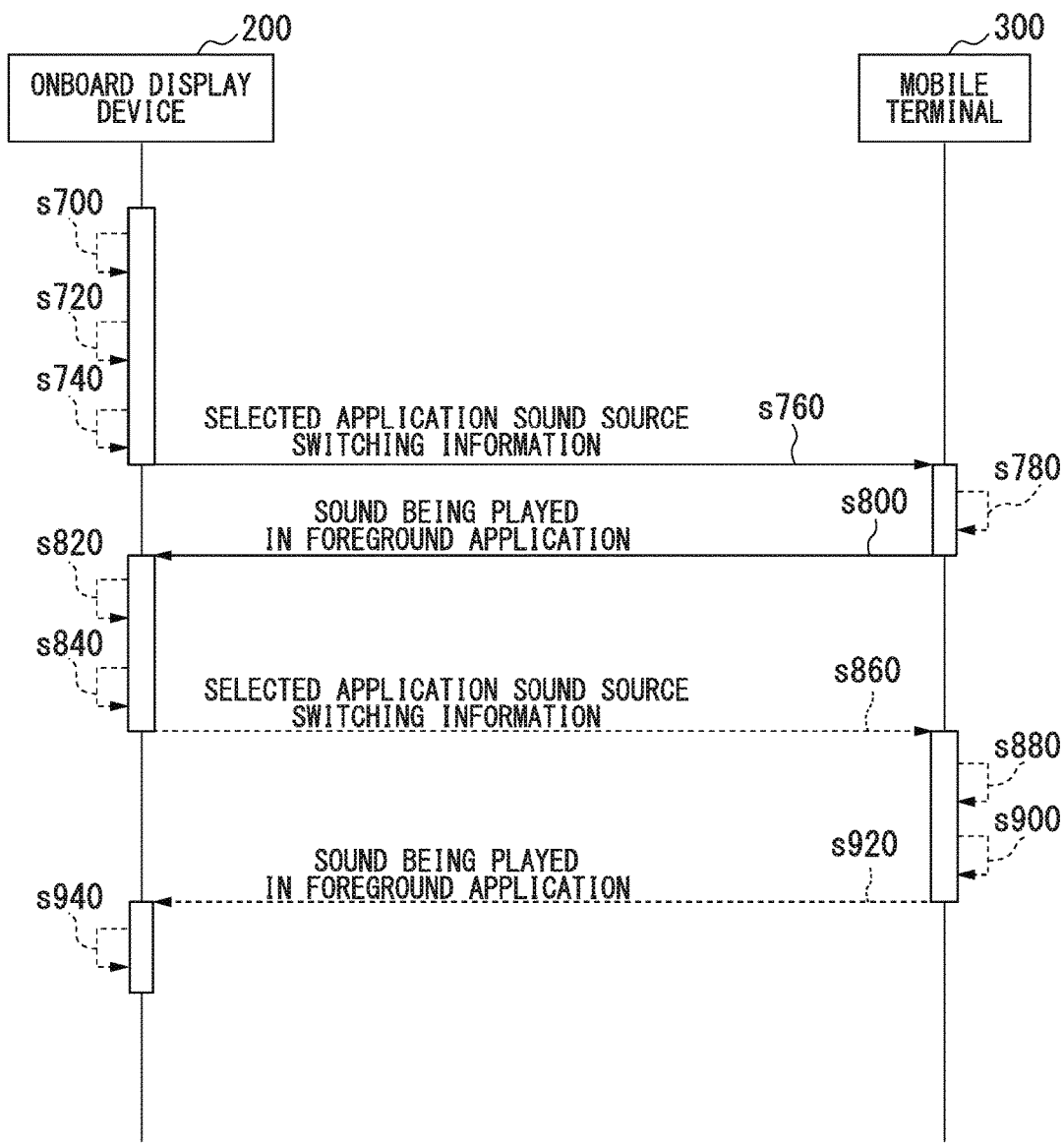
FIG. 6 is a sequence diagram illustrating an example of flows of operations of the onboard display device 200 and the mobile terminal 300 during sound source switching when the foreground application of the mobile terminal 300 is an application appN which is a mobile terminal built-in music application.

FIG. 6 is a sequence diagram illustrating an example of flows of operations of the onboard display device 200 and the mobile terminal 300 during sound source switching when the foreground application of the mobile terminal 300 is the application appN which is a mobile terminal built-in music application.

(Step S700) First, the onboard display device 200 receives information instructing to switch a sound source from a user through the onboard switch input reception unit 280. Hereinafter, the information received in step S700 by the onboard switch input reception unit 280 will be described as indicating switching of a sound source to the FM radio.

(Step S720) Next, the onboard display device 200 starts playing a sound of the FM radio on the basis of the received information instructing to switch a sound source, and outputs the sound of the FM radio from the speaker 270.

(Step S740) Next, the onboard display device 200 receives the information instructing to switch a sound source from a user, again, through the onboard switch input reception unit 280. Hereinafter, the information received in step S740 by the onboard switch input reception unit 280 will be described as indicating switching of a sound source to the application appN which is a mobile terminal built-in application.

(Step S760) Next, the sound source switching unit 236 of the onboard display device 200 acquires information instructing to switch a sound source to the application appN of the mobile terminal 300 as the information instructing to switch a sound source, and thus switches the sound source to a sound which is acquired from the mobile terminal 300.

The sound source switching unit 236 of the onboard display device 200 transmits the selected application sound source switching information including the information for identifying the application appN which has been acquired in step S760, to the mobile terminal 300.

(Step S780) Next, the application switching unit 334 of the mobile terminal 300 acquires the received selected application sound source switching information, but an application program which is presently operating as the foreground application is the application appN, and the a current state is held.

(Step S800) Next, the mobile terminal 300 plays a sound of the application appN operating as the foreground application, and transmits the played sound to the onboard display device 200.

(Step S820) Next, the onboard display device 200 outputs a sound played by the application appN which has been received from the mobile terminal 300, to the speaker 270.

(Step S840) Next, the onboard display device 200 receives the information instructing to switch a sound source from a user, again, through the onboard switch input reception unit 280. Hereinafter, the information received in the step S840 by the onboard switch input reception unit 280 will be described as indicating switching of a sound source to the application app2 which is a dedicated communication control-compatible music application.

(Step S860) Next, the sound source switching unit 236 of the onboard display device 200 acquires information instructing to switch a sound source to the application app2 of the mobile terminal 300 as the information instructing to switch a sound source, and thus holds the sound source as a sound which is acquired from the mobile terminal 300. The sound source switching unit 236 of the onboard display device 200 transmits the selected application sound source switching information including information for identifying the application app2 which has been acquired in step S840, to the mobile terminal 300.

(Step S880) Next, the application switching unit 334 of the mobile terminal 300 switches the foreground application from the application appN to the application app2, on the basis of the information for identifying the application app2 included in the received selected application sound source switching information.

(Step S900) Next, the sound playback stop control unit 336 of the mobile terminal 300 stops playing the sound of the application appN switched from the foreground application to the background application. The sound playback stop control unit 336 and the sound playback start unit 338 start playing the sound of the application app2 switched from the background application to the foreground application.

(Step S920) Next, the mobile terminal 300 operates as the foreground application, and transmits the sound of the application app2 playing a sound to the onboard display device 200.

(Step S940) Next, the onboard display device 200 outputs the sound played by the application app2 which has been received from the mobile terminal 300, to the speaker 270.

In this manner, the mobile terminal 300 can receive the selected application sound source switching information including information for identifying an application program, through the switching operation of a sound source from a user which is received by the onboard display device 200. The mobile terminal 300 can switch the foreground application which is executed in the mobile terminal 300 by the application switching unit 334, on the basis of the received selected application sound source switching information. In addition, the mobile terminal 300 causes the sound playback stop control unit 336 to stop playing a sound of the application program switched from the foreground application to the background application. In addition, the mobile terminal 300 causes the sound playback stop control unit 336 and the sound playback start unit 338 to start playing a sound of the application program switched from the background application to the foreground application. Therefore, the mobile terminal 300 causes the display unit 260 of the onboard display device 200 to display only an image of the dedicated communication control-compatible music application during switching of a sound source from the mobile terminal built-in music application having the sound output priority to the dedicated communication control-compatible music application, and thus can prevent a sound of the mobile terminal built-in music application from being played from the speaker 270.

Figure 7:
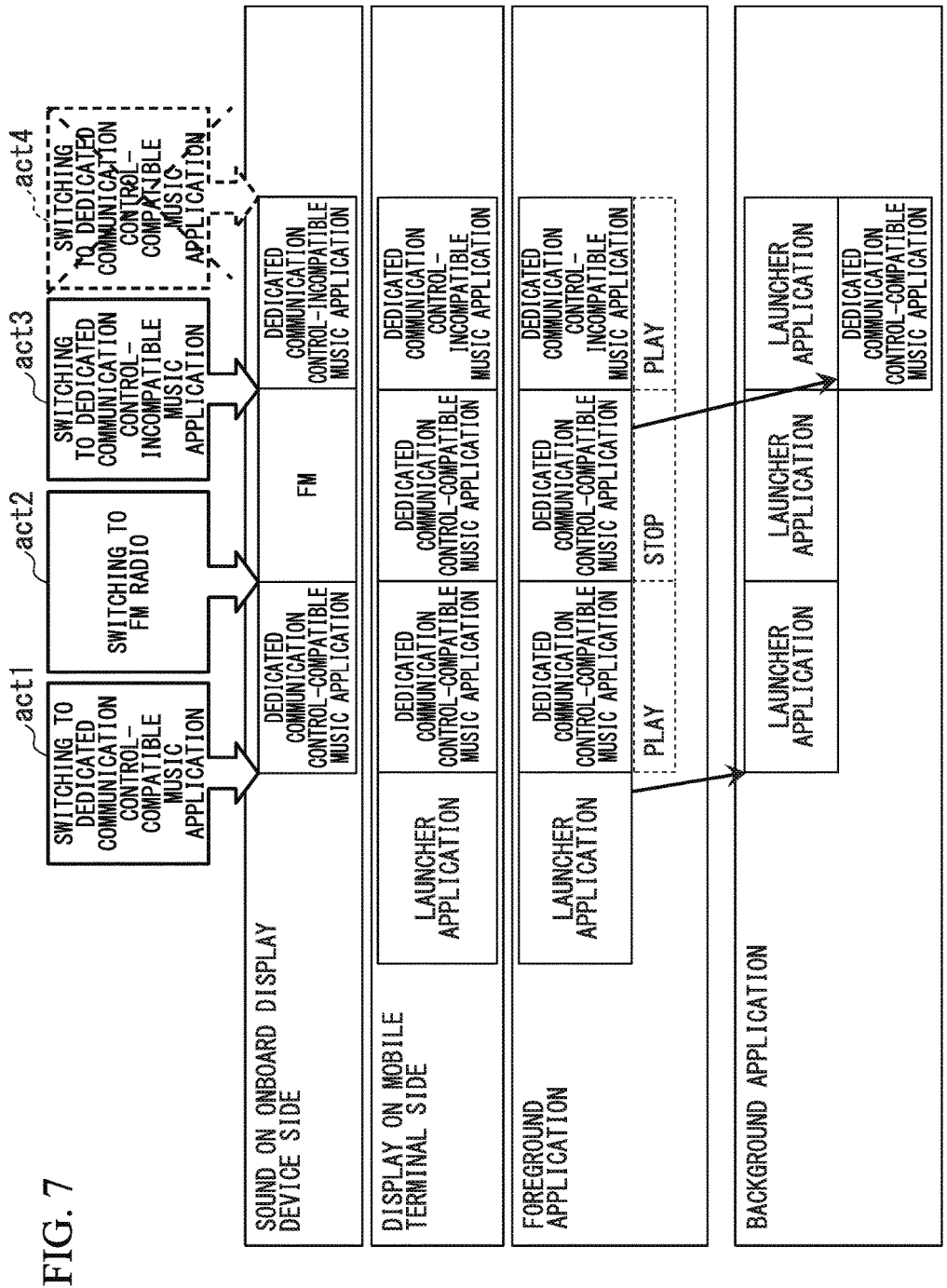
FIG. 7 is a diagram illustrating an example of operations capable of being performed between a general mobile terminal of the related art serving as a target for comparison and the onboard display device, and the problems thereof.

Next, reference will be made to FIGS. 7 to 9 to describe an effect obtained by the present invention by comparing an operation capable of being performed between a general mobile terminal of the related art and the onboard display device with an operation capable of being performed between the mobile terminal 300 and the onboard display device 200 which is an aspect of the present invention. FIG. 7 is a diagram illustrating an example of operations capable of being performed between a general mobile terminal of the related art serving as a target for comparison and the onboard display device, and the problems thereof.

Hereinafter, a description will be given in which the mobile terminal is communicably connected to the onboard display device, and then a launcher application is firstly started up. Meanwhile, a flow of time is assumed to proceed to the observers' right in FIG. 7. In addition, actions act1 to 4 indicate switching operations of a sound source performed on the onboard display device by a user, and timings at which the operations are performed. Since the foreground application is a launcher application immediately after the launcher application is started up, the mobile terminal has the launcher application displayed thereon.

Thereafter, when a user performs an operation for switching a sound source to the dedicated communication control-compatible music application on the onboard display device at the timing of the action act1, in the mobile terminal, the launcher application is switched to the background application, and the foreground application is switched to the dedicated communication control-compatible music application. Therefore, the mobile terminal also displays an image of the dedicated communication control-compatible music application in association therewith. In this case, a sound which is output in the onboard display device is sound played by the dedicated communication control-compatible music application.

Next, when a user performs an operation for switching a sound source to the FM radio on the onboard display device at the timing of the action act2, the sound source of the onboard display device is switched to the FM radio of the onboard display device. Since the playback of the FM radio is performed by the function of the onboard display device, the foreground application of the mobile terminal is held as the dedicated communication control-compatible music application, and the display of the mobile terminal is also held as the image of the dedicated communication control-compatible music application. In addition, the background application is held as the launcher application. On the other hand, the sound of the onboard display device is switched to the sound of the FM radio.

Next, when a user performs an operation for switching a sound source to the dedicated communication control-incompatible music application on the onboard display device at the timing of the action act3, the sound source of the onboard display device is switched to a sound which is played in the mobile terminal. In the mobile terminal, since the dedicated communication control-compatible music application is switched to the background application, and the foreground application is switched to the dedicated communication control-incompatible music application, the mobile terminal also displays an image of the dedicated communication control-incompatible music application in association therewith. In this case, a sound which is played in the onboard display device is a sound played by the dedicated communication control-incompatible music application.

When a user performs an operation for switching a sound source to the dedicated communication control-compatible music application on the onboard display device at the timing of the action act4, the mobile terminal of the related art shown in FIG. 7 may not be able to switch the foreground application to the dedicated communication control-compatible music application. Such a phenomenon occurs, as described above, due to the fact that when the dedicated communication control-incompatible music application is switched to the foreground application, the onboard display device of the related art is not able to recognize the presence of the dedicated communication control-compatible music application having operated as the foreground application until immediately before.

Figure 8:
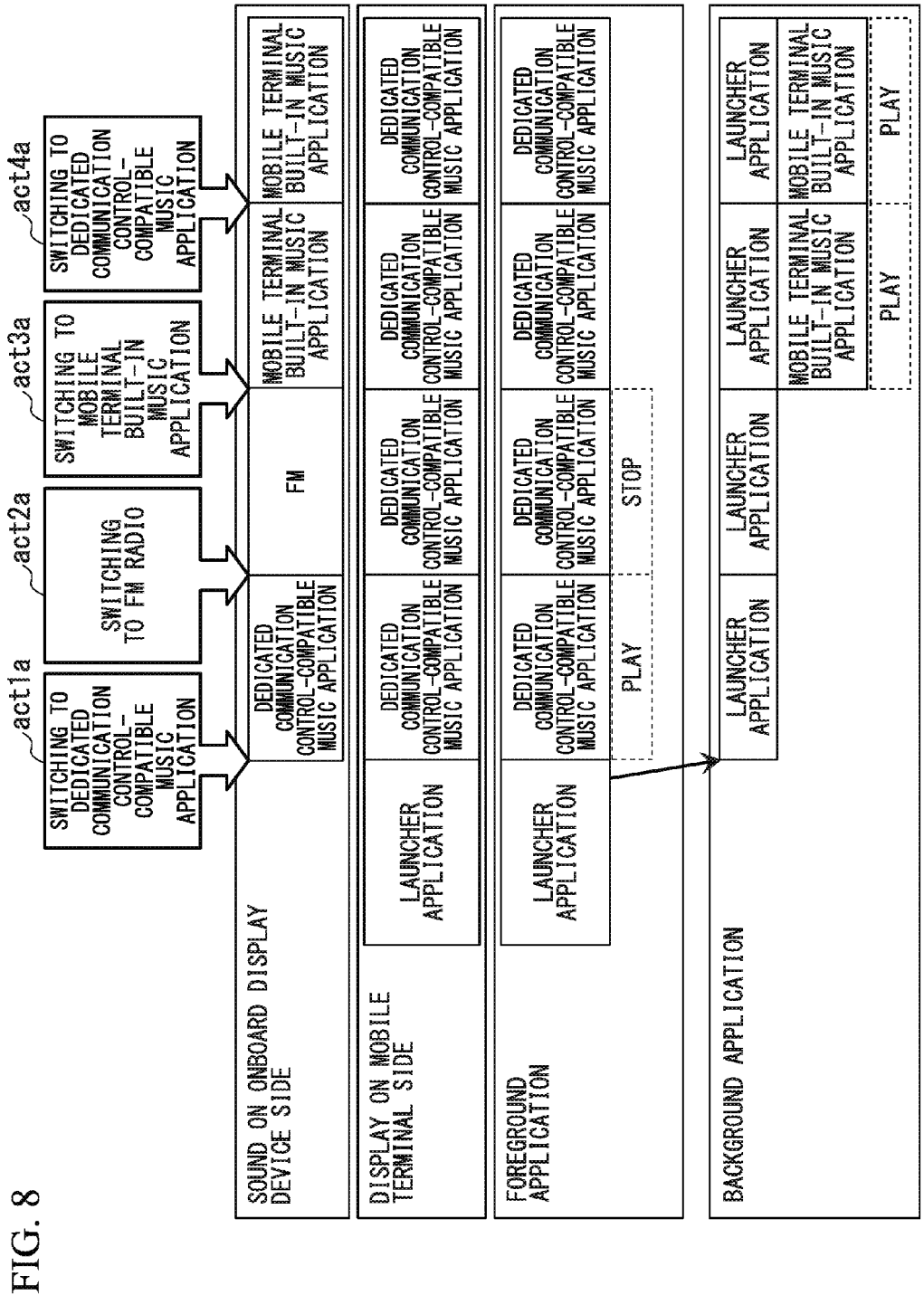
FIG. 8 is a diagram illustrating another example of operations capable of being performed between the general mobile terminal of the related art serving as a target for comparison and the onboard display device, and the problems thereof.

FIG. 8 is a diagram illustrating another example of operations capable of being performed between the general mobile terminal of the related art serving as a target for comparison and the onboard display device, and the problems thereof. Hereinafter, a description will be given in which the mobile terminal is communicably connected to the onboard display device, and then a launcher application is firstly started up. Meanwhile, a flow of time is assumed to proceed to the observers' right in FIG. 8. In addition, actions act1*a* to 4*a* indicate switching operations of a sound source performed on the onboard display device by a user, and timings at which the operations are performed. Here, the description of the example shown in FIG. 8 is the same as that in FIG. 7 until immediately before the timing shown in action act3*a*, the detailed description thereof will not be given.

When a user performs an operation for switching a sound source to the mobile terminal built-in application on the onboard display device at the timing of the action act3*a*, the sound source of the onboard display device is switched to a sound which is played in the mobile terminal. In the mobile terminal, the mobile terminal built-in music application is started up as the background application, and a sound is played. In addition, in the mobile terminal, the foreground application is held, and the display of the mobile terminal is also held in association therewith. In this case, a sound which is output in the onboard display device is a sound played by the mobile terminal built-in music application.

When a user performs an operation for switching a sound source to the dedicated communication control-compatible music application on the onboard display device at the timing of the action act4*a*, in the mobile terminal of the related art shown in FIG. 8, the foreground application is held as the dedicated communication control-compatible music application. However, since the mobile terminal built-in music application has the sound output priority, a sound which is played from the speaker of the onboard display device is held as the mobile terminal built-in music application.

On the other hand, FIG. 9 is a diagram illustrating an example of operations which are performed between the mobile terminal 300 which is an aspect of the present invention and the onboard display device 200. Hereinafter, a description will be given in which the mobile terminal 300 is communicably connected to the onboard display device 200, and then a launcher application is firstly started up. Meanwhile, a flow of time is assumed to proceed to the observers' right in FIG. 9. In addition, actions act1*b* to 4*b* indicate switching operations of a sound source performed on the onboard display device by a user, and timings at which the operations are performed. Here, the description of the example shown in FIG. 9 is the same as that in FIG. 7 until immediately before the timing shown in action act4*b*, the detailed description thereof will not be given.

When a user performs an operation for switching a sound source to the dedicated communication control-compatible music application on the onboard display device at the timing of the action act4*b*, the mobile terminal 300 switches the dedicated communication control-compatible music application having operated as the background application to the foreground application, and switches the dedicated communication control-incompatible music application having operated as the foreground application to the background application.

In addition, the mobile terminal 300 stops playing the sound of the dedicated communication control-incompatible music application at the timing of the action act4*b*, stops playing the sound of the dedicated communication control-incompatible music application, and then starts playing the sound of the dedicated communication control-compatible music application.

In this manner, the mobile terminal 300 which is an aspect of the present invention and the onboard display device 200 connected to the mobile terminal 300 can solve a problem that the foreground application is not able to be switched to the dedicated communication control-compatible music application in the mobile terminal of the related art shown in FIG. 7. In addition, in the mobile terminal of the related art shown in FIG. 8, since the mobile terminal built-in music application has the sound output priority, it is possible to solve a problem that a sound which is played from the speaker of the onboard display device is held as the mobile terminal built-in music application.

Next, reference will be made to FIG. 10 to describe the switching operation of a sound source by the onboard switch 100, and the transition of an image displayed on the onboard display device 200 and a sound played therein before and after switching of a sound source. FIG. 10 is a conceptual diagram illustrating switching operations of a sound source by the onboard switch 100, and the transition of an image displayed on the onboard display device 200 and a sound played therein before and after switching of a sound source.

For example, referring to a row rw1, the onboard display device 200 before switching of a sound source is set to be in a state where an image of navigation (onboard navigation in FIG. 10) operating in the onboard display device 200 is displayed on the screen of the display unit 260, and the FM radio is played from the speaker 270. In addition, the foreground application of the mobile terminal 300 at this point in time is a music application (for example, dedicated communication control-compatible music application). Here, when a user switches a sound source to the music application of the mobile terminal 300 through the onboard switch 100, the onboard display device 200 after switching of a sound source is set to be in a state where the screen of the display unit 260 is held as the image of the onboard navigation, and a sound which is played from the speaker 270 is switched from the FM radio to the music application operating as the foreground application of the mobile terminal 300.

In addition, referring to a row rw2, the onboard display device 200 before switching of a sound source is set to be in a state where information (FM source in FIG. 10) of the FM radio operating in the onboard display device 200 is displayed on the screen of the display unit 260, and the FM radio is played from the speaker 270. In addition, the foreground application of the mobile terminal 300 at this point in time is a navigation application (navigation application in FIG. 10) operating in the mobile terminal 300. Here, when a user operates the onboard switch 100 so that the sound source of the onboard display device 200 is switched to a sound which is played from the mobile terminal 300 by the onboard switch 100, in the onboard display device 200, a sound which is played by the mobile terminal 300 is not included in a candidate of a switching destination of a sound source, and thus a user is not able to switch the sound source to the sound which is played by the mobile terminal 300. Such a phenomenon occurs due to the foreground application of the mobile terminal 300 not being a music application.

In this manner, the mobile terminal 300 which is an aspect of the present invention receives information instructing to switch a sound source acquired within a vehicle by the onboard display device 200, switches an application program having been in operation in the foreground until immediately before, to the background, on the basis of the received information instructing to switch a sound source, switches an application program having been in operation in the background until immediately before, to the foreground, stops playing a sound of the application program having been in operation in the foreground until immediately before, and starts playing a sound of the application program having been in operation in the background until immediately before. Therefore, the application program of the mobile terminal 300 can be smoothly switched on the basis of the information acquired from the onboard display device 200, without depending on the standard of the music application which is installed on the mobile terminal 300.

In addition, the mobile terminal 300 switches the application program having been in operation in the foreground until immediately before, to the background, switches the application program having been in operation in the background until immediately before, to the foreground, then stops playing the sound of the application program having been in operation in the foreground until immediately before, and starts playing the sound of the application program having been in operation in the background until immediately before, subsequently to the stop. Therefore, it is possible to smoothly switch the application program of the mobile terminal 300, and to smoothly switch an application program which plays a sound in the mobile terminal 300.

In addition, the mobile terminal 300 starts playing the sound of the application program having been in operation in the background until immediately before, through the dedicated application programming interface (API). Therefore, even in the case of a situation where the playback of the sound of an application program is not able to be started in control based on the API specified for each mobile terminal 300, it is possible to play the sound of the application program.

As stated above, the embodiment of the present invention have been described in detail with reference to the accompanying drawings, but specific configurations are not limited to these embodiment, and may be changed, substituted, deleted, and the like without departing from the scope of the present invention.

REFERENCE SIGNS LIST

1: electronic communication system, 100: onboard switch, 200: onboard display device, 210: vehicle-side first communication unit, 220: vehicle-side second communication unit, 230: processor, 231: vehicle-side input determination unit, 232: vehicle-side information provision unit, 233: vehicle-side first communication control unit, 234: vehicle-side second communication control unit, 235: output control unit, 236: sound source switching unit, 240: vehicle-side storage unit, 250: vehicle-side input reception unit, 260: display unit, 270: speaker, 280: onboard switch input reception unit, 290: radio reception unit, 300: mobile terminal, 310: mobile-side first communication unit, 320: mobile-side second communication unit, 330: processor, 331: application function unit, 334: application switching unit, 336: sound playback stop control unit, 338: sound playback start unit, 340: mobile-side storage unit, 350: mobile-side input reception unit, 360: display unit, 370: speaker, 380: external communication unit

The invention claimed is:

1. In combination an onboard device and a separate mobile terminal that performs communication with the onboard device, wherein:
   the onboard device comprises:
   a first processor programmed to control functions of the onboard device, the first processor including
   a reception unit configured to receive a sound played by an application program operating in a foreground of the mobile terminal;
   an output unit configured to output the sound received by the reception unit;
   an acquisition unit configured to acquire instructions inputted to the onboard device to switch a sound source by selecting application programs of the mobile terminal; and
   a transmission unit configured to transmit instructions to the mobile terminal including information indicating an application program which is executed in the mobile terminal, the information directing switching an application program having been in operation in a foreground until immediately before in the mobile terminal, to a background, and switching an application program having been in operation in a background until immediately before in the mobile terminal, to a foreground, to switch a sound source acquired by the acquisition unit; and
   the mobile terminal comprises:
   a second processor programmed to control functions of the mobile terminal, the second processor including
   a communication control unit configured to control reception of the instructions from the onboard device to switch a sound source of the mobile terminal;
   a switching unit configured to switch the application program having been in operation in a foreground until immediately before, to a background, on the basis of the received information instructing to switch a sound source, and to switch an application program having been in operation in a background until immediately before, to a foreground, based on the instructions received from the onboard device; and
   a sound control unit configured to stop playing a sound of the application program having been in operation in a foreground until immediately before, and to start playing a sound of the application program having been in operation in a background until immediately before, based on the switch by the switching unit.

2. The combination according to claim 1, wherein after switching is performed by the switching unit, the sound control unit stops playing the sound of the application program having been in operation in a foreground until immediately before, and starts playing the sound of the application program having been in operation in a background until immediately before, based on the switch by the switching unit.

3. The combination according to claim 2, wherein the sound control unit includes a dedicated application programming interface (API) through which the sound control unit starts playing the sound.

4. The combination according to claim 2, further comprising a communication unit configured to transmit information, indicating at least one or more application programs which are executed in the terminal, to the onboard device.

5. The combination according to claim 1, wherein the sound control unit includes a dedicated application programming interface (API) through which the sound control unit starts playing the sound.

6. The combination according to claim 5, further comprising a communication unit configured to transmit information, indicating at least one or more application programs which are executed in the terminal, to the onboard device.

7. The combination according to claim 1, further comprising a communication unit configured to transmit information, indicating at least one or more application programs which are executed in the terminal, to the onboard device.

8. The combination according to claim 1, wherein the sound control unit stops reproducing the sound of the application program having been in operation in the foreground until immediately before, while maintaining communication with the onboard device.

9. A control method of a mobile terminal that communicates with an onboard device such that the mobile terminal transmits a sound, played by an application program operating in a foreground of the mobile terminal, to the onboard device, the method comprising:
acquiring instructions inputted to the onboard device to switch a sound source by selecting application programs of the mobile terminal;
transmitting the instructions from the onboard device to the mobile terminal to switch a sound source of the mobile terminal, the instructions including information indicating an application program which is executed in the mobile terminal serving as the sound source;
switching an application program having been in operation in a foreground of the mobile terminal until immediately before, to a background, and switching an application program having been in operation in a background of the mobile terminal until immediately before, to a foreground, based on the instructions as received by the mobile terminal; and
stopping playing a sound of the application program having been in operation in a foreground of the mobile terminal until immediately before, and starting playing a sound of the application program having been in operation in a background of the mobile terminal until immediately before, subsequently to the stop based on the instructions received from the onboard device.

10. The method according to claim 9, wherein the mobile device includes a sound control unit which stops reproducing the sound of the application program having been in operation in the foreground until immediately before, while maintaining communication with the onboard device, based on the instructions received from the onboard device.

11. A computer which is programmed to effect a control program for controlling a mobile terminal that performs communication with an onboard device, whereby the computer executes:
a procedure of receiving instructions inputted to the onboard device to switch a sound source by selecting one of different application programs of the mobile terminal;
a procedure of transmitting the instructions from the onboard device to the mobile terminal, the instructions including information indicating an application program which is executed in the mobile terminal serving as the sound source;
a procedure of transmitting a sound, played by an application program operating in a foreground of the mobile terminal, to the onboard device;
a procedure of switching an application program having been in operation in a foreground of the mobile terminal until immediately before, to a background, and switching an application program having been in operation in a background of the mobile terminal until immediately before, to a foreground, based on the instructions received from the onboard device; and
a procedure of stopping playing a sound of the application program having been in operation in a foreground of the mobile terminal until immediately before, and starting playing a sound of the application program having been in operation in a background of the mobile terminal until immediately before, based on the instructions received from the onboard device.

12. The computer according to claim 11, wherein the procedure of stopping playing a sound of the application program having been in operation in a foreground of the mobile terminal until immediately before, and starting playing a sound of the application program having been in operation in a background of the mobile terminal until immediately before involves stopping reproduction of the sound of the application program having been in operation in the foreground until immediately before, while maintaining communication between a sound control unit of the mobile device and the onboard device.

13. An onboard device that performs communication with a mobile terminal, the onboard device comprising:
a processor programmed to control functions of the onboard device, the processor including
a reception unit configured to receive a sound played by an application program operating in a foreground of the mobile terminal;
an output unit configured to output the sound received by the reception unit;
an acquisition unit configured to acquire instructions inputted to the onboard device to switch a sound source by selecting application programs of the mobile terminal; and
a transmission unit configured to transmit the instructions to the mobile terminal, including information indicating an application program which is executed in the mobile terminal, the information directing switching an application program having been in operation in a foreground until immediately before in the mobile terminal, to a background, and switching an application program having been in operation in a background until immediately before, to a foreground, based on the instructions to switch a sound source acquired by the acquisition unit.

14. The onboard device according to claim 13, wherein the reception unit receives information, indicating at least one or more application programs which are executed in the mobile terminal, from the mobile terminal.

15. The onboard device according to claim 13, wherein the mobile unite includes a sound control unit which, based on the instructions received from the onboard device, stops reproducing the sound of the application program having been in operation in the foreground until immediately before, while maintaining communication with the onboard device.

* * * * *